(12) United States Patent
Sumi et al.

(10) Patent No.: US 8,936,383 B2
(45) Date of Patent: Jan. 20, 2015

(54) SADDLE-RIDING TYPE VEHICLE AND LIGHT GUIDE USED IN SAME

(75) Inventors: Takahiro Sumi, Iwata (JP); Masumi Tachibana, Iwata (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 89 days.

(21) Appl. No.: 13/606,504

(22) Filed: Sep. 7, 2012

(65) Prior Publication Data

US 2013/0063966 A1     Mar. 14, 2013

(30) Foreign Application Priority Data

Sep. 8, 2011   (JP) .................................. 2011-195581

(51) Int. Cl.
*B62J 6/00*     (2006.01)
*F21V 8/00*    (2006.01)
(Continued)

(52) U.S. Cl.
CPC ............. *F21S 48/225* (2013.01); *B60Q 1/0047* (2013.01); *B60Q 1/26* (2013.01); *B62J 6/00* (2013.01); *F21S 48/2268* (2013.01); *F21S 48/2287* (2013.01); *B62J 6/20* (2013.01); *B62J 17/02* (2013.01); *F21S 48/2243* (2013.01); *F21S 48/2237* (2013.01); *G02B 6/0036* (2013.01); *G02B 6/0045* (2013.01)
USPC ........... 362/602; 362/475; 362/511; 362/626; 362/473

(58) Field of Classification Search
CPC .......... B60Q 1/04; B60Q 1/02; B60Q 1/0408; B60Q 1/0458; A63C 2203/14; B62J 6/00; B62J 6/02; F21S 48/1241; F21S 48/10; F21S 8/10; G02B 6/0038; G02B 6/0028; G02B 6/0061

USPC ......... 362/459, 473, 475–476, 511, 602, 608, 362/610, 623, 625–626, 551, 507, 538, 522, 362/309, 339, 340
See application file for complete search history.

(56) References Cited

U.S. PATENT DOCUMENTS

2005/0189545 A1    9/2005   Tazawa et al.
2010/0149829 A1    6/2010   Kazaoka et al.
2010/0254152 A1*  10/2010   Taleb-Bendiab et al. ..... 362/551

FOREIGN PATENT DOCUMENTS

EP       0 594 089 A1    4/1994
JP       2005-114894     4/2005
(Continued)

OTHER PUBLICATIONS

Machine Translation of JP 2009262914 A.*
(Continued)

*Primary Examiner* — Diane Lee
*Assistant Examiner* — Naomi M Wolford
(74) *Attorney, Agent, or Firm* — Rabin & Berdo, P.C.

(57) ABSTRACT

A position light and light guide that serve as a light source are disposed on a front cover. The light guide extends in a width direction and receives and reflects light from the position light that is emitted in the width direction of the chassis. The light guide has first and second emission faces. The first emission face emits a first portion of the reflected light and faces upward or downward. The second emission face emits a second portion of the reflected light and faces forward. A length of the light guide in a front and back direction and a length of the light guide in a normal direction of the first emission face that is normal to the first emission face are both shorter than a length of the light guide in the width direction.

10 Claims, 15 Drawing Sheets

(51) Int. Cl.
F21S 8/10 (2006.01)
B60Q 1/00 (2006.01)
B60Q 1/26 (2006.01)
B62J 6/20 (2006.01)
B62J 17/02 (2006.01)

(56) References Cited

FOREIGN PATENT DOCUMENTS

| | | |
|---|---|---|
| JP | 2006-236588 | 9/2006 |
| JP | 2007-062565 A | 3/2007 |
| JP | 2009-262914 | 11/2009 |
| JP | 2009262914 A * | 11/2009 |
| KR | 10-2010-0084469 | 7/2010 |

OTHER PUBLICATIONS

Extended European Search Report issued on Mar. 13, 2014, for the corresponding European patent application No. 12183503.7 (8 pages total).

* cited by examiner

SADDLE-RIDING TYPE VEHICLE AND LIGHT GUIDE USED IN SAME

CROSS-REFERENCE TO RELATED APPLICATION

This application is based on, and claims priority to, Japanese Patent Application No. 2011-195581, filed on Sep. 8, 2011, the contents of which are incorporated herein by reference.

BACKGROUND OF THE INVENTION

1. Field of the Invention

The present invention relates to a saddle-riding type vehicle, and to a light guide used in this vehicle.

2. Description of the Background Art

A saddle-riding type vehicle, which is typified by a motorcycle, is equipped with a front cover at the front of the chassis. A headlight is usually attached to the front cover, and position lights are also sometimes attached.

A speedometer, handlebar, and front fork are disposed to the rear of the front cover. Space must be left behind the front cover so that these members can rotate easily. Therefore, the size of the front cover in the front and back direction is preferably as small as possible.

Furthermore, a smaller front cover (in front view) improves the aerodynamics of a saddle-riding type vehicle. A windscreen is disposed above the front cover, and the front wheel is disposed below the front cover. Therefore, in front view, it is particularly favorable for the size of the front cover to be as small as possible in the up and down direction.

The headlight, position lights, and other such illumination lamps are disposed in the center part of the front cover, where they can only be disposed in a limited area. Smaller illumination lamps allow the size of the front cover to be smaller in the front and back direction and the up and down direction. However, if the illumination lamps are smaller, the light emission surface area is also smaller, so the quantity of light may be inadequate.

Japanese Laid-Open Patent Application 2007-062565 proposes a technique for solving this problem. The vehicular illumination device disclosed in Japanese Laid-Open Patent Application 2007-062565 comprises a pair of projector lamps, a light guide, and first and second reflectors. The light guide is disposed below the pair of projector lamps. The light guide receives light from the projector lamps, and light is emitted from the front end face of the light guide. The first and second reflectors are disposed above the projector lamps. The first and second reflectors are disposed opposite each other, and form a light guide path over which light from the projector lamps is guided upward. In other words, the vehicular illumination device of Patent Literature 2007-62565 uses a light guide and first and second reflectors to emit light from projector lamps upward and forward. Consequently, this vehicular illumination device has a larger emission surface area than when just a pair of projector lamps is provided.

Nevertheless, with the vehicular illumination device in Patent Literature 2007-62565, the light guide and the first and second reflectors have to be disposed on the front cover in order for the light of the projector lamps to be emitted upward and forward. This makes it difficult to reduce the size of the front cover.

SUMMARY OF THE INVENTION

The saddle-riding type vehicle pertaining to an embodiment of the present invention comprises a chassis, a front cover, a light source, and a light guide. The front cover is disposed at a front part of the chassis. The light source and the light guide are disposed on the front cover. The light guide extends in the width direction of the chassis, and receives light moving from the light source in the width direction of the chassis. The light guide reflects the light emitted from the light source. The light guide has first and second emission faces. The first emission face faces upward or downward from the chassis and emits a first portion of the reflected light. The second emission face faces forward from the chassis and emits a second portion of the reflected light. A length of the light guide in a front and back direction of the chassis and a length of the light guide in a normal direction of the first emission face that is normal to the first emission face are shorter than a length of the light guide in the width direction of the chassis.

With the saddle-riding type vehicle pertaining to an embodiment of the present invention, the size of the front cover can be kept small while allowing visibility to be increased.

It is an object of the present invention to provide a saddle-riding type vehicle with which a sufficient quantity of light can be ensured from the lights provided to the front cover, without increasing the size of the front cover.

Other features, elements, steps, characteristics and advantages of the present invention will become more apparent from the following detailed description of the preferred embodiments of the present invention with reference to the attached drawings.

DETAILED DESCRIPTION OF THE PREFERRED EMBODIMENTS

Figure 1:
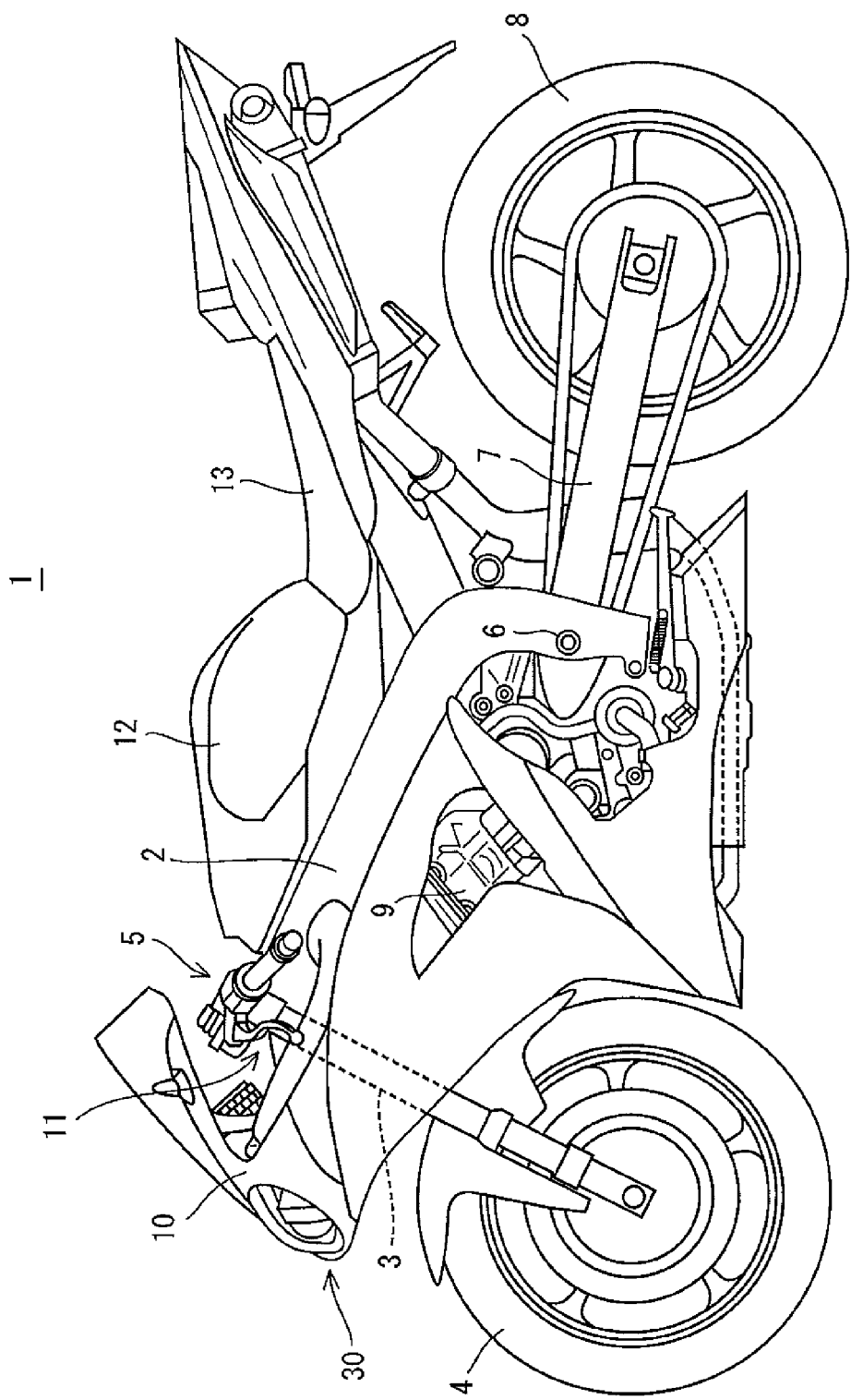
FIG. 1 is a side view of the saddle-riding type vehicle pertaining to an embodiment of the present invention.

The saddle-riding type vehicle pertaining to an embodiment of the present invention will now be described through reference to the drawings. The "saddle-riding type vehicle" referred to in this Specification encompasses motorcycles, all-terrain vehicles, snowmobiles, and so forth. The term "motorcycle" here encompasses scooters and mopeds. The saddle-riding type vehicle 1 shown in FIG. 1 is an on-road motorcycle. However, the saddle-riding type vehicle in this embodiment is not limited to being an on-road motorcycle. The saddle-riding type vehicle in this embodiment may instead be an off-road motorcycle. In this Specification, front, rear, left, and right are directions as seen from the point of view of a rider riding the saddle-riding type vehicle.

Overall Configuration of Saddle-Riding Type Vehicle 1

The saddle-riding type vehicle 1 comprises a head pipe 11, a front fork 3, a front wheel 4, a handlebar 5, a rear arm 7, a rear wheel 8, and an engine 9.

The head pipe 11 is disposed at the front part of the chassis. The handlebar 5 is rotatably attached above the head pipe 11. The front fork 3 is disposed below the head pipe 11. The front wheel 4 is rotatably attached to the lower end of the front fork 3.

A frame 2 is connected to the head pipe 11. The frame 2 extends from the head pipe 11 toward the rear of the saddle-riding type vehicle 1. The rear end of the frame 2 is bent downward. A pivot shaft 6 is provided to the rear end of the frame 2. The front end of the rear arm 7 is attached to the pivot shaft 6, and the rear arm 7 is supported rotatably up and down around the pivot shaft 6. The rear wheel 8 is rotatably attached to the rear end of the rear arm 7.

The engine 9 is disposed below the frame 2. The engine 9 is attached to the frame 2 by a support plate. A fuel tank 12 is disposed above the frame 2. A seat 13 is disposed to the rear of the fuel tank 12.

Configuration of Front Cover 10

Figure 2:
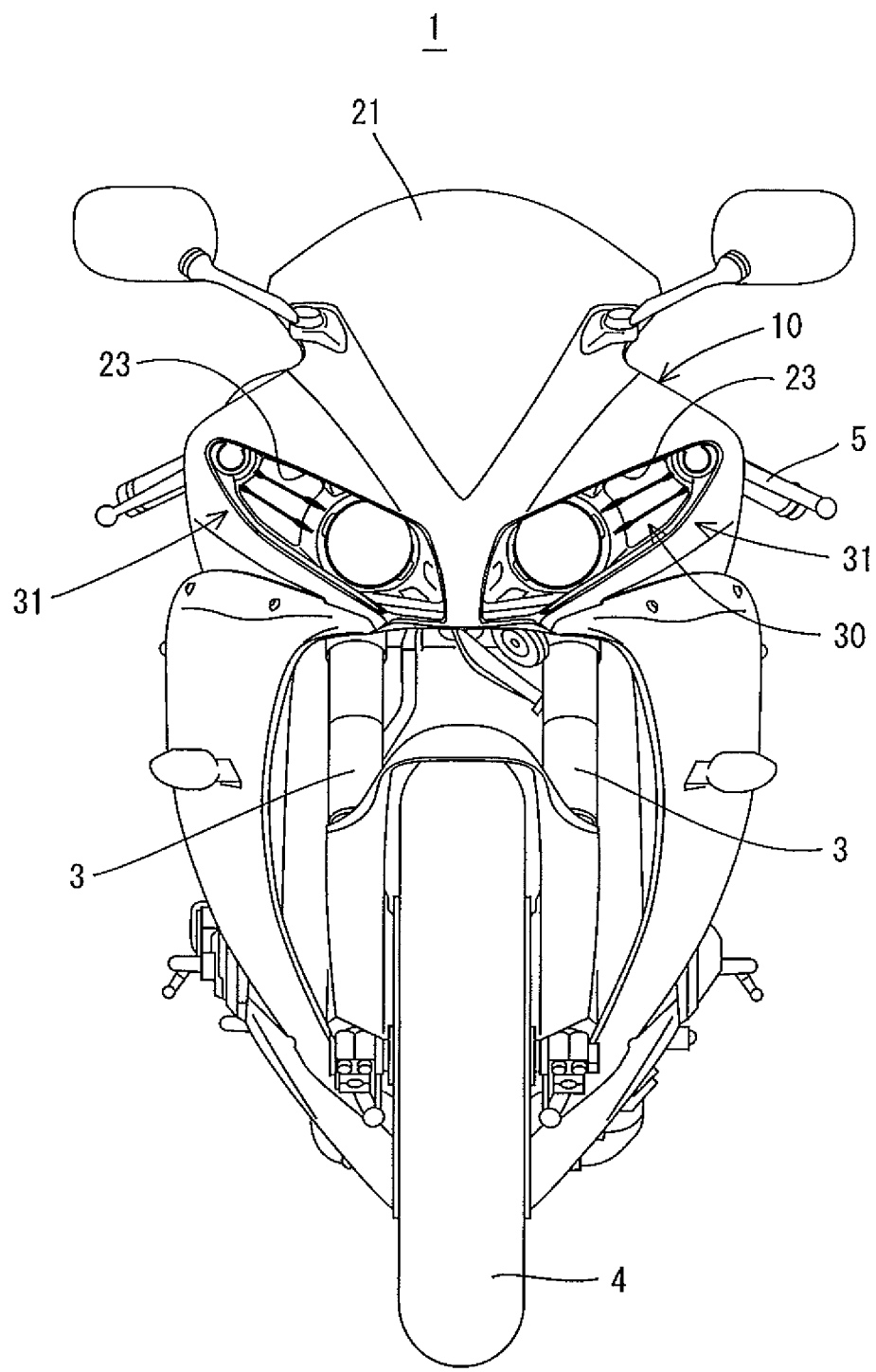
FIG. 2 is a front view of the saddle-riding type vehicle shown in FIG. 1.

A front cover 10 is disposed at the front part of the chassis. FIG. 2 is a front view of the saddle-riding type vehicle 1. As shown in FIG. 2, the front cover 10 comprises a windscreen 21 at its upper part. The front cover 10 also has a pair of openings 23. The openings 23 are disposed on the left and right in front view, with the center in the width direction of the saddle-riding type vehicle 1 in between.

A headlight unit 30 is disposed on the rear face side of the front cover 10. The headlight unit 30 comprises a pair of left and right light components 31 at its front part. Each of the light components 31 is disposed in one of the openings 23.

Figure 3:
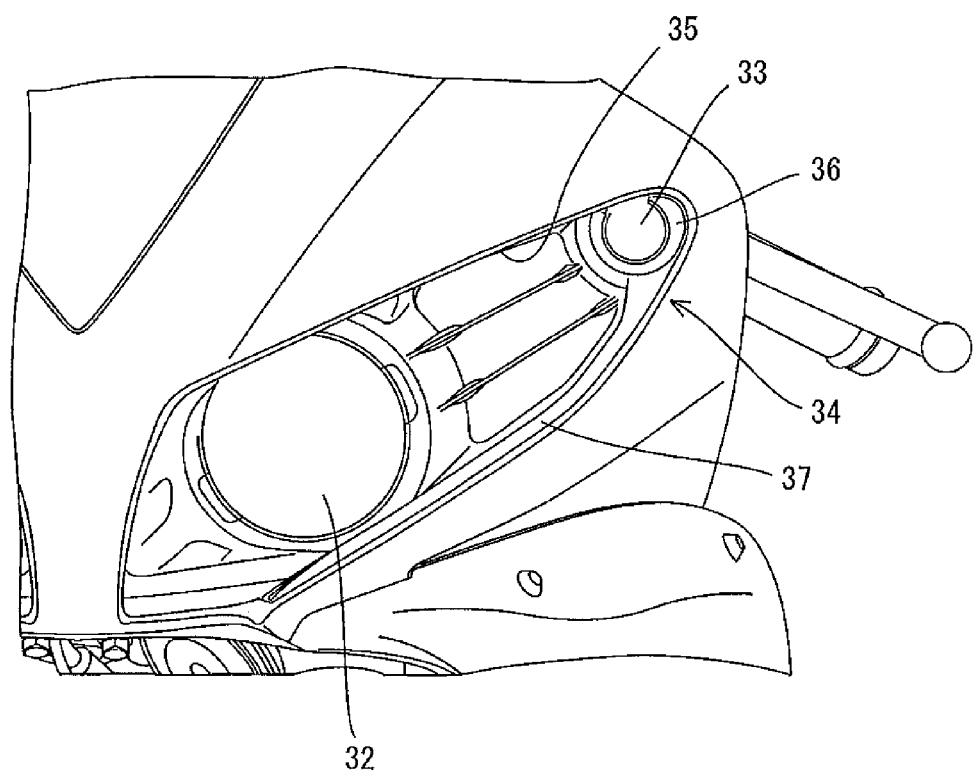
FIG. 3 is a detail enlargement of the area around the lights in FIG. 2.

FIG. 3 is a front view of the left light component 31, out of the pair of light components 31. The configuration of the left light component 31 will now be described through reference to FIG. 3. The configuration of the right light component 31 is the same as that of the left light component 31.

As shown in FIG. 3, the light component 31 comprises a headlight 32, a position light 33, and a light emitting member 34.

The headlight 32 is disposed toward the center of the saddle-riding type vehicle 1 in front view, while the position light 33 is disposed more to the side of the saddle-riding type vehicle 1. The position light 33 is disposed away from the headlight 32, and is disposed diagonally upward with respect to the headlight 32. A through-hole 35 is formed between the headlight 32 and the position light 33. When the vehicle is being ridden, the through-holes 35 introduce outside air and supply it to the engine 9.

Figure 4:
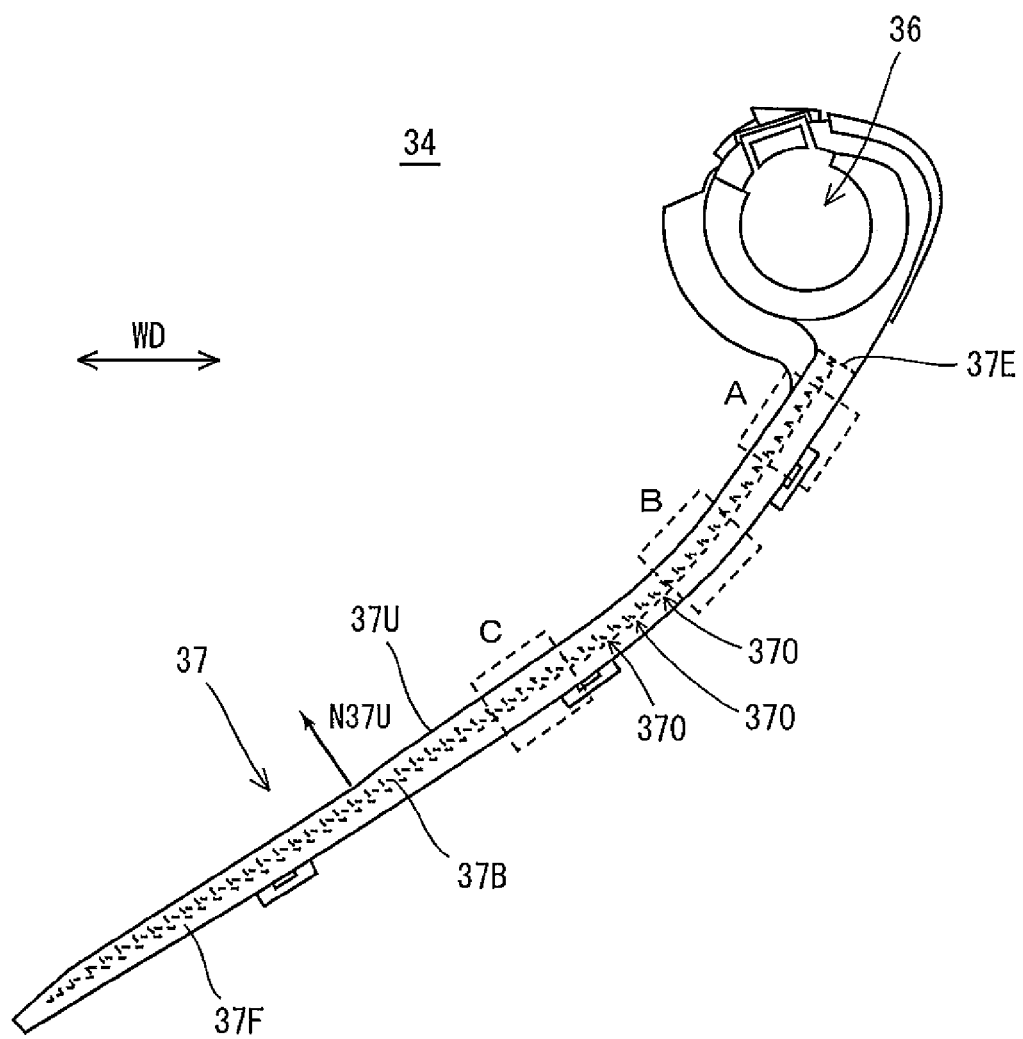
FIG. 4 is a front view of the light emitting members in FIG. 3.

FIG. 4 is a front view of the light emitting member 34. As shown in FIGS. 3 and 4, the light emitting member 34 comprises a light cover 36 and a light guide 37. The light cover 36 is disposed in front of the position light 33, and covers the position light 33. The light emitted from the position light 33 is transmitted forward through the light cover 36. The light cover 36 also transmits emitted light from the position light 33 and guides it to an end 37E of the light guide 37 (see FIG. 4).

Figure 5:
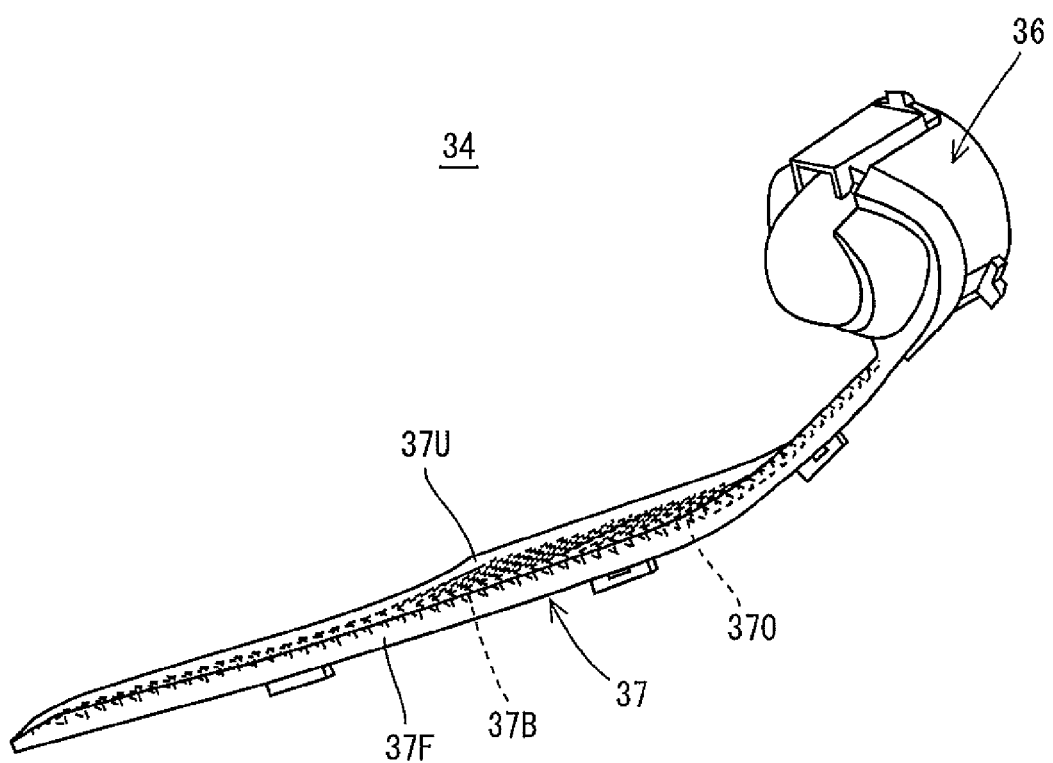
FIG. 5 is an oblique view of the light emitting members shown in FIG. 4.
Figure 6:
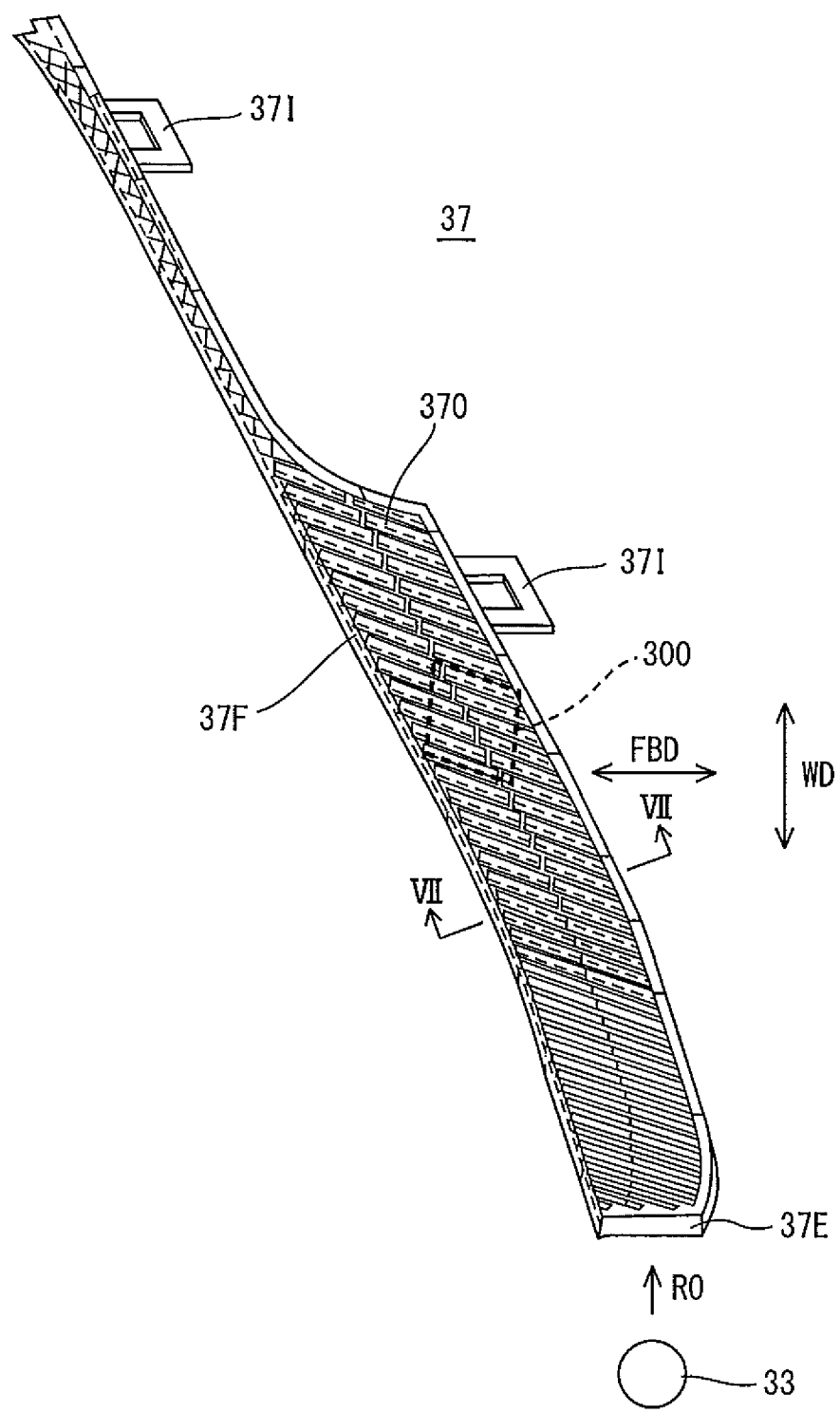
FIG. 6 is a plan view of the light guide shown in FIG. 4.

The light guide 37 is disposed below the position light 33, and extends in the width direction WD of the saddle-riding type vehicle 1. More specifically, the light guide 37 extends diagonally downward from the light cover 36 toward the center of the saddle-riding type vehicle 1. FIG. 5 is an oblique view of the light emitting member 34, and FIG. 6 is a plan view of the light guide 37 in the light emitting member 34. As shown in FIGS. 4 to 6, the light guide 37 has a flat form. That is, the light guide 37 is longer in the width direction WD and shorter in the chassis front and back direction and up and down direction. Accordingly, installing the light guide 37 does not increase the size of the front cover in the up and down direction or the front and back direction.

The light guide 37 receives emitted light from the position light 33 (light source), and emits light. As shown in FIG. 6, a plurality of attachment members 371 are formed along the rear edge of the light guide 37. The attachment members 371 are used to attach the light guide 37 to the main part of the headlight unit 30.

Configuration of Light Guide 37

As shown in FIGS. 4 to 6, the light guide 37 has emission faces 37F and 37U, and a structured face 37B.

Figure 7:
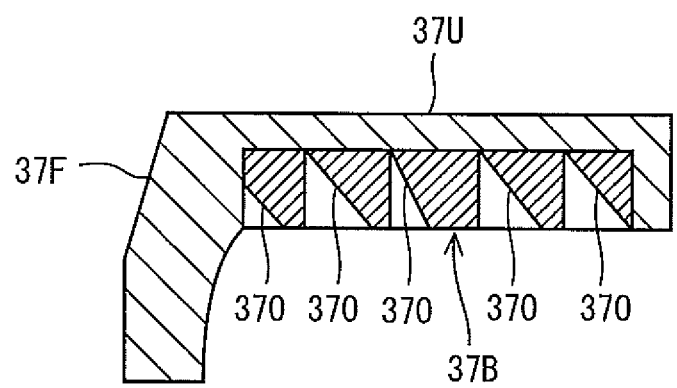
FIG. 7 is a cross section along the VII-VII line in FIG. 6.

The structured face 37B is disposed on the opposite side from the emission face 37U. The emission face 37U is a smooth surface. The structured face 37B, on the other hand, has a plurality of optical structures 370. In this example, the emission face 37U corresponds to the upper face of the light guide 37, and the structured face 37B corresponds to the lower face of the light guide 37. The emission face 37F corresponds to the front face of the light guide 37, and is a smooth surface. FIG. 7 is a cross section along the VII-VII arrow in FIG. 6. As shown in FIG. 7, the emission face 37F is adjacent to the emission face 37U.

Figure 8:
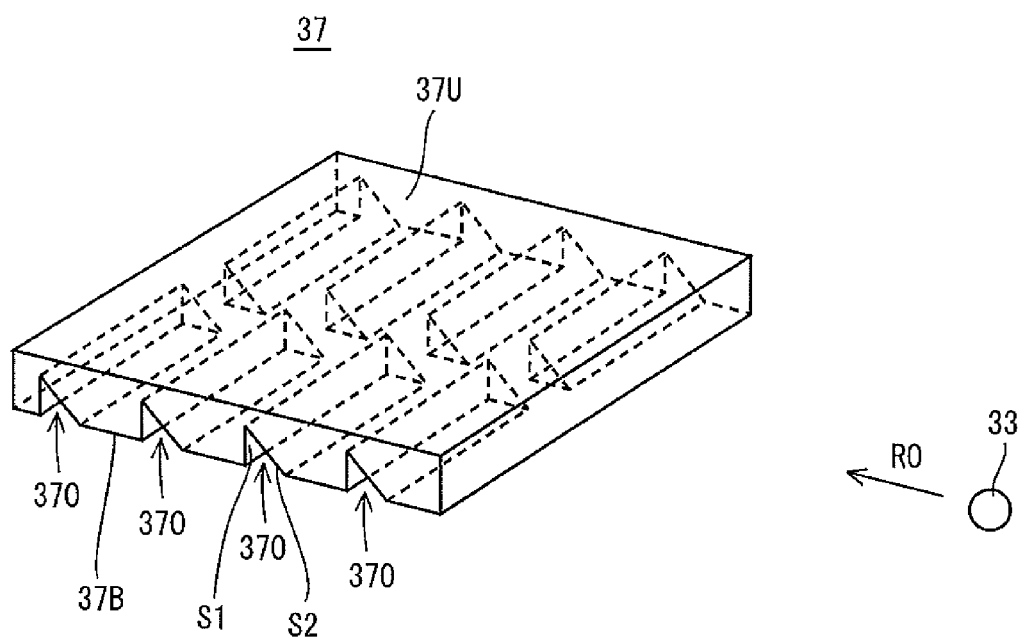
FIG. 8 is an oblique view of the region 300 in FIG. 6, which is a portion of the light guide shown in FIG. 6.

FIG. 8 is an oblique view of the region 300 in FIG. 6, which is a portion of the light guide 37. As shown in FIG. 8, the structured face 37B has a plurality of the optical structures 370. The optical structures 370 are in the form of grooves, and the width of the lateral cross sectional shape thereof decreases toward the groove bottom. In this example, the optical structures 370 are what are known as prismatic grooves. The plurality of optical structures 370 are disposed arranged in the width direction of the optical structures 370. In FIG. 8, the optical structures 370 are arranged in two rows.

Figure 9:
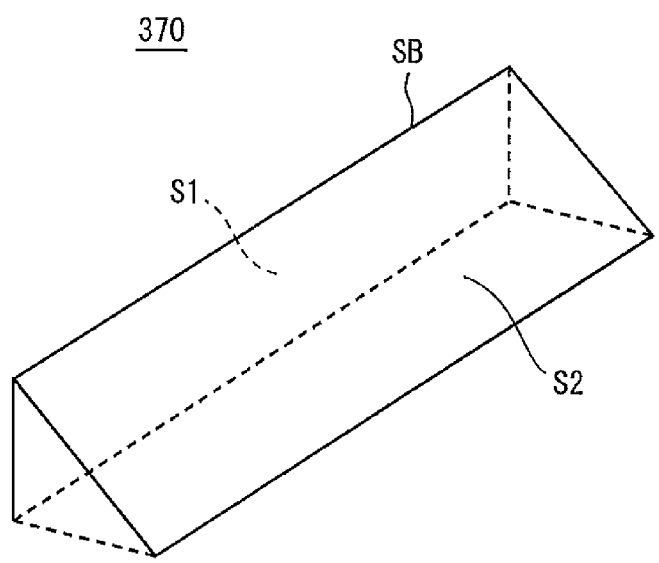
FIG. 9 is an oblique view of one of the optical structures 370 in FIG. 8.

FIG. 9 is an oblique view of an optical structure 370. As shown in FIG. 9, the optical structure 370 has side faces S1 and S2. The side face S1 and the side face S2 are linked at a groove bottom SB. The side face S2 is disposed closer to the light source (the position light 33) than the side face S1.

As shown in FIGS. 6 and 8, of the light emitted from the position light 33, the light R0 moving in the width direction of the saddle-riding type vehicle 1 (hereinafter referred to as width direction light R0) passes through the light cover 36 and is incident on the end 37E of the light guide 37. The light guide 37 fully reflects the width direction light R0 at the structured face 37B and emits upward from the emission face 37U. The light guide 37 also fully reflects the width direction light R0 at the structured face 37B and emits forward from the emission face 37F. In other words, the light guide 37 emits the width direction light R0 in two directions (upward and forward). Since light from the light source can be emitted in two directions by a single member (the light guide 37), the size of the front cover 10 can be kept small, while the emission surface area can be increased. The structure of the light guide 37 will be discussed in detail below.

How the Width Direction Light R0 is Emitted from the Emission Face 37F

As shown in FIG. 8, the plurality of optical structures 370 are arranged in the width direction of the light guide 37. As shown in FIG. 6, the optical structures 370 extend so as to intersect the width direction WD and the front and back direction FBD of the saddle-riding type vehicle 1. That is, the optical structures 370 are inclined with respect to the width direction WD, and are also inclined with respect to the front and back direction FBD. Since the optical structures 370 are inclined with respect to the width direction WD, the light guide 37 can emit the width direction light R0 in the forward direction.

Figure 10:
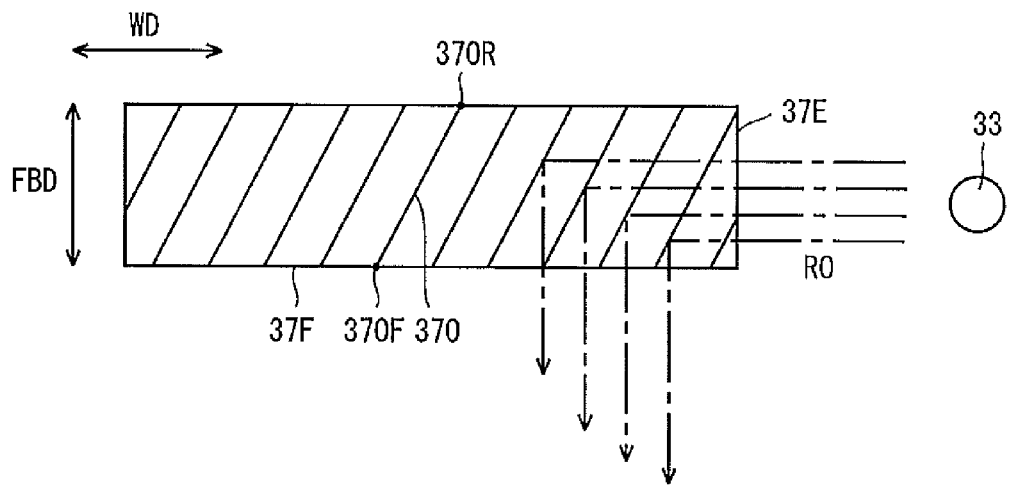
FIG. 10 is a schematic view of the path within the light guide of light moving in the width direction of the saddle-riding type vehicle, in plan view.

FIG. 10 is a schematic view of the path taken by the width direction light R0 moving through the light guide 37, and is a schematic of the light guide 37 in plan view. The optical structures 370 are indicated by lines in FIG. 10 for the sake of illustration. The width direction light R0 emitted from the light source (the position light 33) passes through the light cover 36 and is incident on the end 37E of the light guide 37. The width direction light R0 moves in the width direction WD through the light guide 37. As discussed above, the optical structures 370 are inclined with respect to the width direction WD. Therefore, when the width direction light R0 is incident on the optical structures 370 (on their side faces S2), the width direction light R0 is fully reflected. As shown in FIG. 10, the optical structures 370 are inclined with respect to the width direction WD so that of the ends 370F and 370R of the optical structures 370, the ends 370F on the emission face 37F side are disposed farther away from the light source (the position light 33) than the other ends 370R. Accordingly, the light R0 fully reflected by the optical structures 370 moves in the emission face 37F direction. As a result, the width direction light R0 is emitted forward from the light guide 37.

In plan view, the optical structures 370 are preferably inclined with respect to the width direction WD so that the incident angle at which the width direction light R0 is incident on the optical structures 370 is at least a critical angle. In this case, since more of the width direction light R0 can be fully reflected, there is an increase in the brightness of the emission face 37F.

However, even if the incident angle of the width direction light R0 onto the optical structures 370 is less than the critical angle, the light guide 37 can still emit the light from the light source forward to a certain extent. The light from the light source is light other than the width direction light R0, and includes light that deviates somewhat from the width direction WD. This is because this light also moves through the light guide 37 while being fully reflected, and is fully reflected by the optical structures 370 and emitted forward.

How the Width Direction Light R0 is Emitted from the Emission Face 37U

The light guide 37 also emits the width direction light R0 from the emission face 37U. That is, the light guide 37 emits the width direction light R0 not only forward, but also upward.

Figure 11:
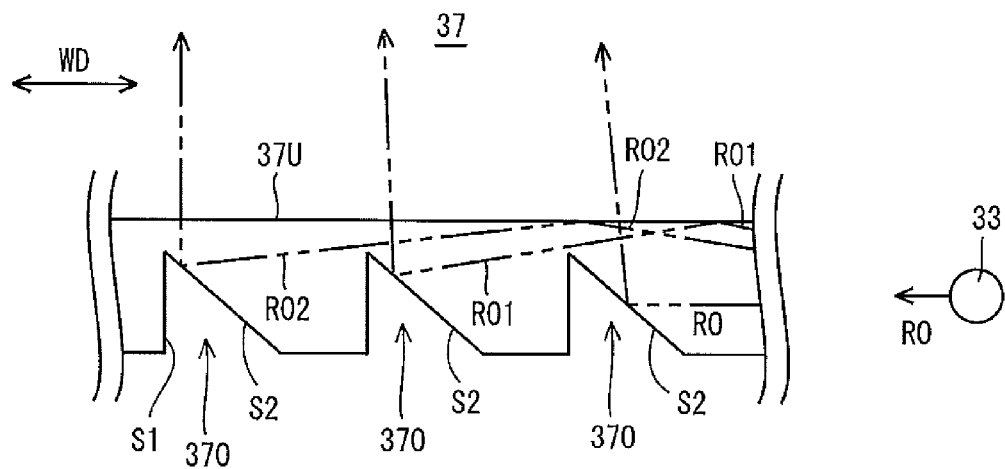
FIG. 11 is a schematic view of the path within the light guide of light moving in the width direction of the saddle-riding type vehicle, in front view.

FIG. 11 is a schematic view of the path of the width direction light R0 moving through the light guide 37, when the light guide 37 is seen in front view. As discussed above, the optical structures 370 are in the form of grooves, and the width of their lateral cross sectional shape gradually narrows toward the groove bottom. The side faces S1 and S2 of the optical structures 370 are flat, and the side faces S2 are disposed closer to the light source (the position light 33) than the side faces S1.

The width direction light R0 moves through the light guide 37 in the width direction WD. Here, the width direction light R0 is incident on and fully reflected by the side faces S2 of the optical structures 370. The light R0 fully reflected by the side faces S2 moves upward and is emitted to the outside from the emission face 37U.

Parts (R01 and R02) of the width direction light R0 moving through the light guide 37 are incident on the emission face 37U. In this case, the incident angle of the light R01 and R02 on the emission face 37U exceeds the critical angle. Therefore, the light R01 and R02 is fully reflected by the emission face 37U and continues moving through the light guide 37 in the width direction WD. As a result, the light R01 and R02 is incident on the side faces S2 of the optical structures 370. At this point the light R01 and R02 is fully reflected by the side faces S2 and is emitted upward from the emission face 37U.

The side faces S2 are preferably disposed inclined so that the incident angle at which the width direction light R0 is incident on the optical structures 370 will be at least the critical angle in a lateral cross section of the optical structures 370. In this case, most of the width direction light R0 is fully reflected and emitted upward from the emission face 37U. This increases the brightness of the emission face 37U.

However, even if the incident angle of the width direction light R0 on the side faces S2 is less than the critical angle, the light guide 37 can still emit the light from the light source (the position light 33) upward to a certain extent. The light from the light source is light other than the width direction light R0, and includes light that deviates somewhat from the width direction WD. This is because this light is also incident on the light guide 37, moves through the light guide 37 while being fully reflected, and is fully reflected by the side faces S2 and emitted upward.

As discussed above, the optical structures 370 are inclined with respect to the width direction WD, and of the two ends of the optical structures 370, the end 370F on the emission face 37F is disposed farther away from the light source (the position light 33) than the end 370R on the opposite side. The width direction light R0 moving in the light guide 37 is fully reflected by the optical structures 370 and emitted forward from the emission face 37F. The optical structures 370 further have a lateral cross sectional shape that gradually narrows toward the groove bottom, and have the side faces S1 and S2. The optical structures 370 fully reflect the width direction light R0 at the side faces S2, and emit the light R0 upward from the emission face 37U.

In other words, the light guide 37 can emit the width direction light R0 incident from the light source (the position light 33) in two directions (upward and forward). Therefore, the emission surface area of the saddle-riding type vehicle 1 is expanded by the use of a single member (the light guide 37). Furthermore, as shown in FIGS. 4 and 6, the length of the light guide 37 in the front and back direction FBD and its length in the direction of a normal line N37U of the emission face 37U are shorter than the length of the light guide 37 in the width direction WD. Therefore, the saddle-riding type vehicle 1 can produce a sufficient quantity of illumination without an increase in the size of the front cover 10. In particular, the size of the front cover 10 can be reduced in the front and back direction and the up and down direction. Preferably, the length of the light guide 37 in the normal line N37U direction is shorter than the length of the light guide 37 in the front and back direction FBD. The size of the front cover 10 in the up and down direction can be made even smaller in this case.

The light guide 37 preferably has the following configuration in order to minimize brightness unevenness between the emission faces 37F and 37U.

Figure 12:
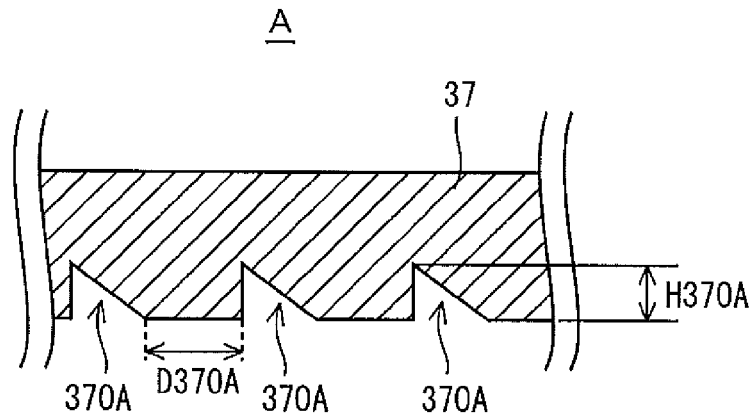
FIG. 12 is a cross section of region A in FIG. 4.
Figure 13:
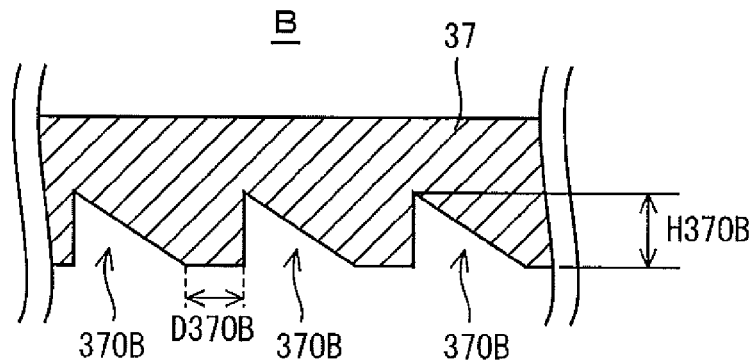
FIG. 13 is a cross section of region B in FIG. 4.

FIG. 12 is a cross section of the light guide 37 in region A in FIG. 4 (a cross section in the width direction WD). FIG. 13 is a cross section of the light guide 37 in region B in FIG. 4. As shown in FIGS. 12 and 13, the plurality of optical structures 370 includes a plurality of optical structures 370A and a plurality of optical structures 370B. The optical structures 370A are disposed closer to the light source (the position light 33) than the optical structures 370B. The height H370A of the optical structures 370A is lower than the height H370B of the optical structures 370B.

If the optical structures 370A were lower in height than the optical structures 370B, nearly all of the width direction light R0 would be fully reflected by the optical structures 370A, making it difficult for the width direction light R0 to reach the optical structures 370B. If this happened, there might be uneven brightness at the emission face 37F. More specifically, the brightness of the emission faces 37F and 37U in region A would be higher than that of the emission faces 37F and 37U in region B.

In this embodiment, the optical structures 370A are lower than the optical structures 370B. Therefore, part of the width direction light R0 passes over the optical structures 370A, moves in the width direction WD through the light guide 37, and reaches the optical structures 370B. As a result, the width direction light R0 is fully reflected not only by the optical structures 370A, but also by the optical structures 370B. Therefore, uneven brightness is less apt to occur.

Figure 14:
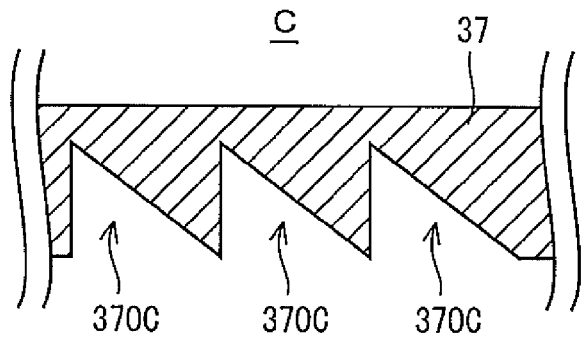
FIG. 14 is a cross section of region C in FIG. 4.

FIG. 14 is a cross section of the light guide 37 in region C in FIG. 4. As shown in FIGS. 12 to 14, the plurality of optical structures 370 further includes a plurality of optical structures 370C in region C. The optical structures 370C are disposed farther away from the light source than the optical structures 370B, and are taller than the optical structures 370B. In other words, the optical structures 370 are formed such that the ones closer to the light source (the position light 33) are lower in height. This reduces uneven brightness at the emission faces 37F and 37U.

More preferably, adjacent optical structures 370A and 370B are disposed separated from one another, and the distance 370A between adjacent optical structures 370A (see FIG. 12) is greater than the distance 370B between adjacent optical structures 370B (see FIG. 13). In other words, the optical structures 370 are formed such that the closer they are to the light source, the greater is the distance between the adjacent optical structures 370. This reduces uneven brightness at the emission faces 37F and 37U.

The optical structures 370 may also be the same height, and the distances may be the same between adjacent optical structures 370. Adjacent optical structures 370 may also be in contact with each other. Here again, the light guide 37 can emit the width direction light R0 in two directions (upward and forward).

Figure 15:
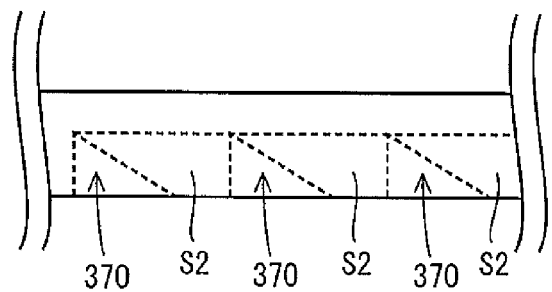
FIG. 15 is a front view of part of the light guide in FIG. 4.
Figure 16:
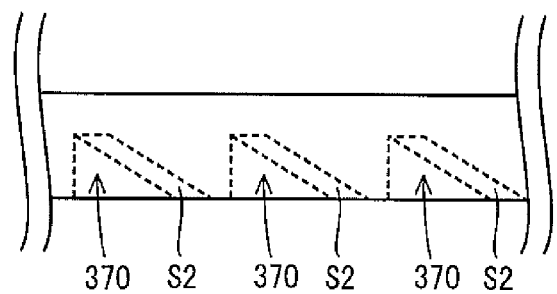
FIG. 16 is a front view of part of a light guide in a comparative example.

As shown in FIG. 15, it is preferable if adjacent optical structures 370, that are adjacent to each other in the width direction of the chassis, overlap each other in a front view of the light guide 37. More specifically, the side faces S2 of adjacent optical structures 370 overlap each other. As shown in FIG. 16, if the side faces S2 of adjacent optical structures 370 did not overlap, then the brightness at the side faces S2 would be greater than that in other portions of the emission face 37F. That is, there would be uneven brightness. As shown in FIG. 15, if the side faces S2 of adjacent side faces S2 overlap in front view, then the entire emission face 37F emits light in a band shape. Therefore, there is less unevenness in brightness.

In the above embodiment, the structured face 37B corresponds to the lower face of the light guide 37, and the emission face 37U corresponds to the upper face of the light guide 37. Since the lower face of the light guide 37 is the structured face 37B, water drops and dust will tend not to accumulate on the optical structures 370.

In the above embodiment, the optical structures 370 are prismatic grooves and have the side faces S1 and S2. The surface area of the side faces S2 is preferably larger than that of the side faces S1. Of the side faces S1 and S2, the ones that have the role of emitting light forward and upward are the side faces S2. If the side faces S2 are larger than the side faces S1, then more light can be emitting forward and upward.

Figure 17:
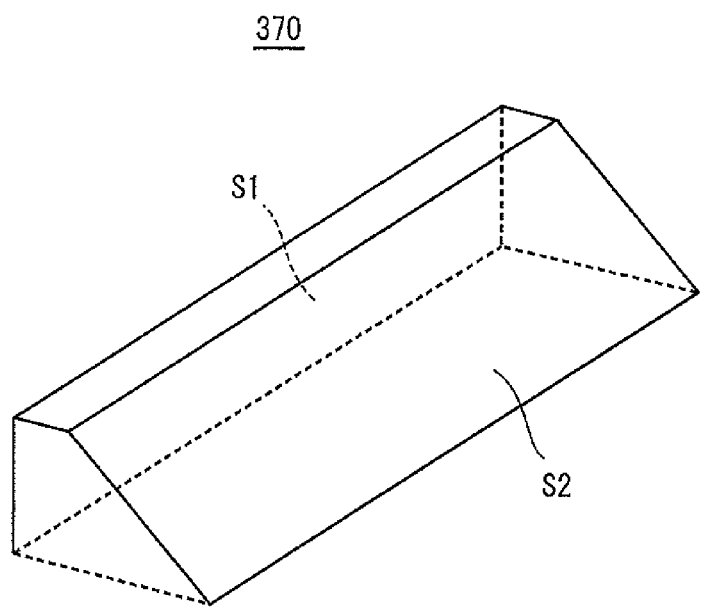
FIG. 17 is an oblique view of another optical structure, which is different from that in FIG. 9.
Figure 18:
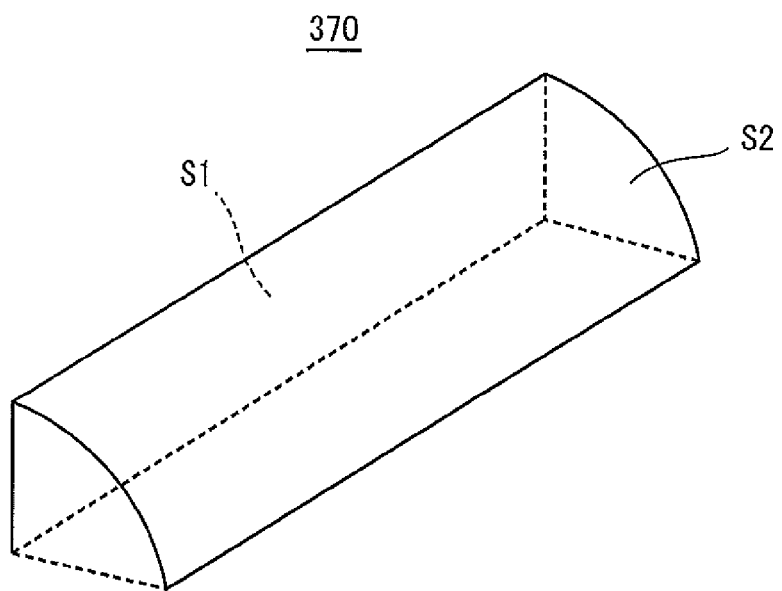
FIG. 18 is an oblique view of another optical structure, which is different from those in FIGS. 9 and 17.
Figure 19:
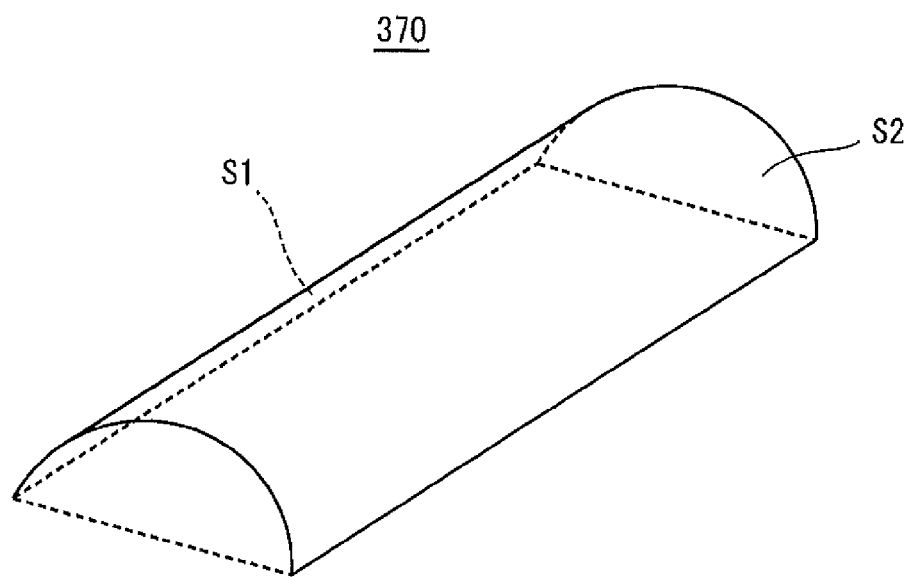
FIG. 19 is an oblique view of another optical structure, which is different from those in FIGS. 9, 17, and 18.

As shown in FIG. 9, in the above embodiment the optical structures 370 are prismatic grooves. However, the shape of the optical structures 370 is not limited to this. For example, as shown in FIG. 17, the optical structures 370 may be grooves whose lateral cross sectional shape is trapezoidal. Also, as shown in FIG. 18, the side faces S2 of the optical structures 370 may be curved in a convex shape. Although not depicted in the drawings, the side faces S2 may also be curved in a concave shape. Furthermore, as shown in FIG. 19, the optical structures 370 may be cylindrical grooves. In other words, there are no particular restrictions on the shape of the optical structures 370, so long as they have a lateral cross sectional shape in which the width narrows toward the groove bottom.

Figure 20:
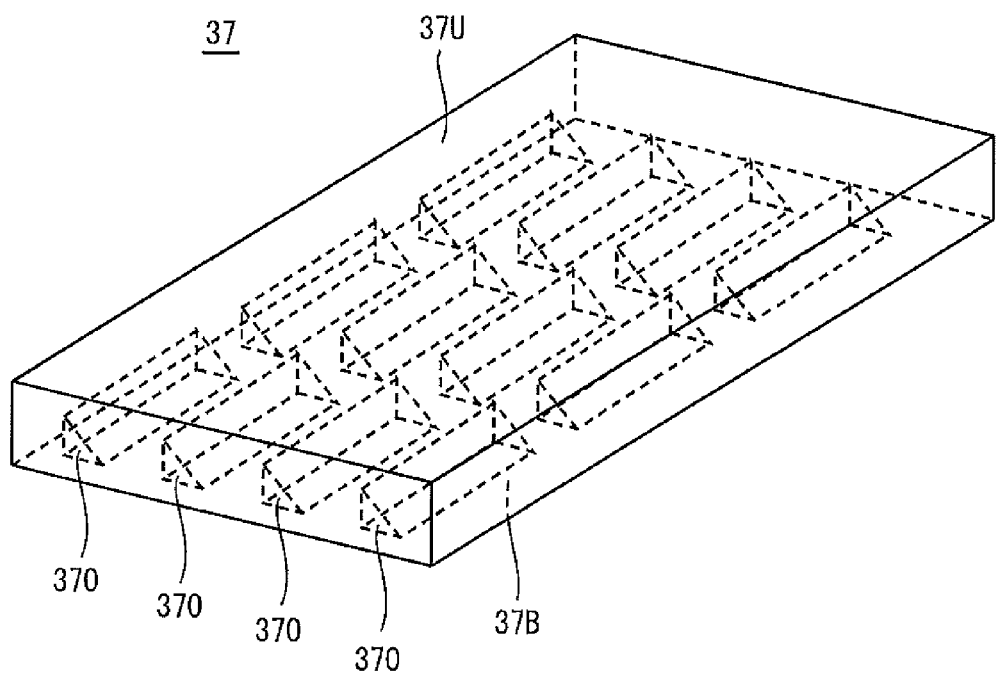
FIG. 20 is an oblique view of part of another light guide, which is different from that in FIG. 4.

In FIGS. 6 and 8, the optical structures 370 are arranged in two rows in the light guide 37. There are no particular restrictions on the number of rows of the optical structures 370, however. The optical structures 370 may be arranged in one row, or as shown in FIG. 20, they may be arranged in three or more rows.

In the above embodiment, the position light 33 serves as the light source. The position light 33 may be an ordinary light bulb in which a light emitting element has been sealed, or may be an LED (light emitting diode) element. If the position light 33 is utilized as the light source, there is no need to provide an additional light source for light guide 37 use. Therefore, the increase in the size of the front cover 10 that would be occasioned by providing an additional light source can be avoided.

However, some other light source besides the position light 33 may be used as the light source for light guide 37 use. For instance, an additional LED element may be provided under the position light 33, and this LED element used as a light source. Here again, light is emitted in two directions by a single light guide 37. Therefore, the size of the front cover 10 can be reduced.

Figure 21:
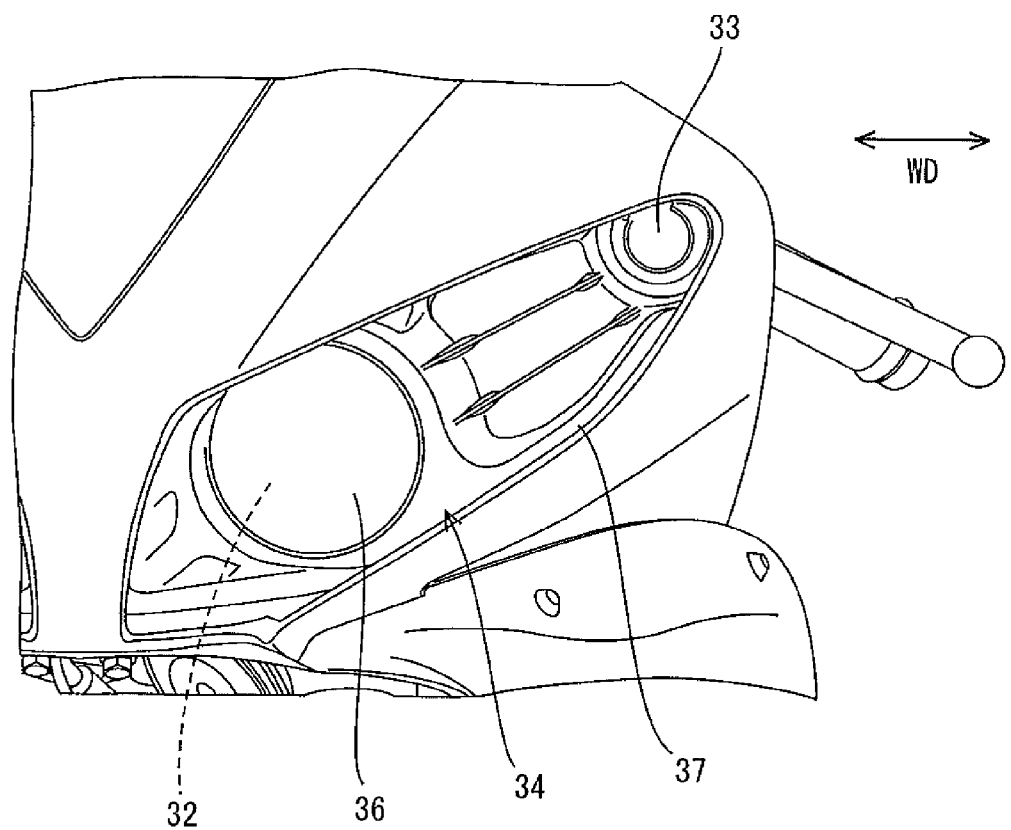
FIG. 21 is a front view of a saddle-riding type vehicle, and shows an example of the layout of another light guide, which is different from that in FIG. 3.

As shown in FIG. 21, the headlight 32 may be used as a light source instead of the position light 33. In this case, the light cover 36 of the light emitting member 34 covers the headlight 32. The light guide 37 extends in the width direction WD from the light cover 36 covering the headlight 32, toward the side of the saddle-riding type vehicle 1 (that is, toward the position light 33). In this case, the optical structures 370 are inclined with respect to the width direction WD so that the ends 370F thereof (the ends on the emission face 37F; see FIG. 10) are farther away from the headlight 32 than the other ends 370R. That is, the optical structures 370 are inclined to the opposite side from that when the position light 33 is used as the light source. This allows light from the headlight 32 to be emitted forward and upward.

Figure 22:
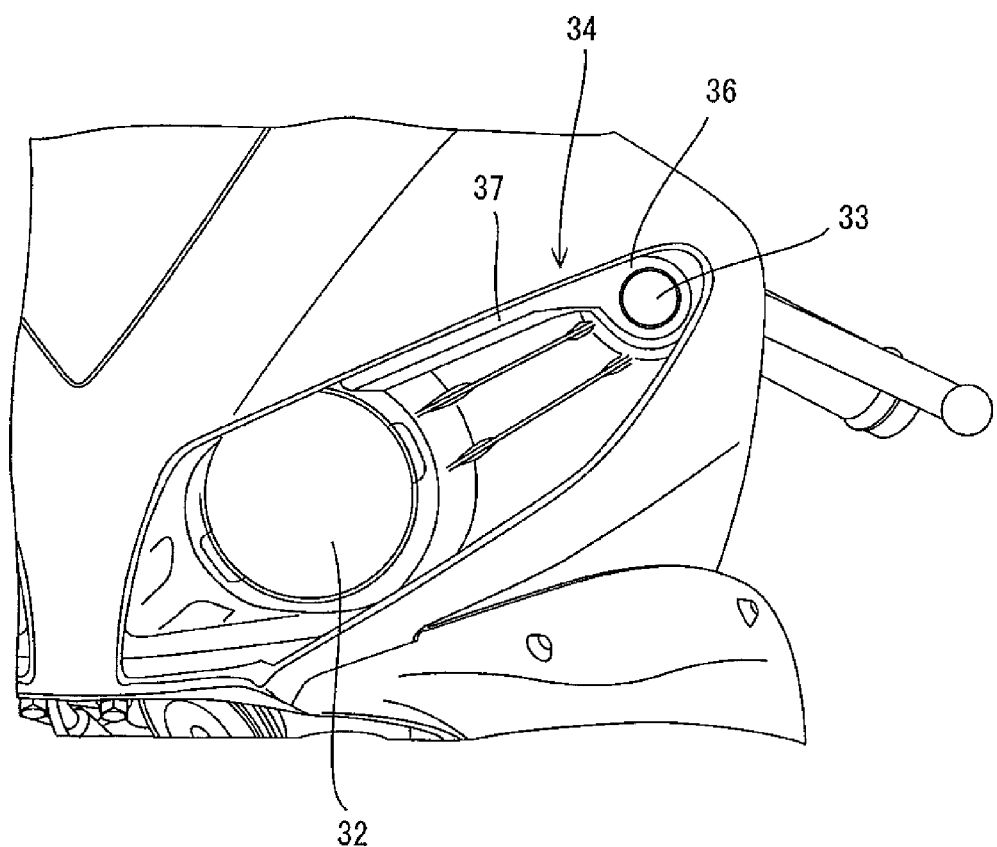
FIG. 22 is a front view of a saddle-riding type vehicle, and shows an example of the layout of another light guide, which is different from those in FIGS. 3 and 21.

As shown in FIG. 22, the light guide 37 may be disposed above the position light 33 and the headlight 32, with the position light 33 serving as the light source. In this case, the structured face 37B is disposed on the upper face of the light guide 37, and the emission face 37U is disposed on the lower face of the light guide 37. Accordingly, the light guide 37 emits the width direction light R0 forward and downward. Here again, the light guide 37 allows the size of the front cover 10 to be kept small, while the emission surface area can be increased and visibility improved.

As discussed above, the saddle-riding type vehicle pertaining to this embodiment comprises a front cover, a light source, and a light guide. The front cover is disposed at the front part of the chassis. The light source and the light guide are disposed on the front cover. The light guide extends in the width direction of the chassis, and receives light moving from the light source in the width direction of the chassis. The light guide has first and second emission faces. The first emission face faces up or down from the chassis and emits light. The second emission face that faces forward from the chassis and emits light. The length of the light guide in the front and back direction of the chassis and the length of the light guide in the normal direction of the first emission face are shorter than the length of the light guide in the width direction of the chassis.

With the saddle-riding type vehicle pertaining to this embodiment, the light guide emits light forward and either upward or downward. The length of the light guide in the front and back direction of the chassis and the length of the light guide in the normal direction of the first emission face are shorter than the length of the light guide in the width direction of the chassis. Therefore, the light guide allows the size of the front cover to be kept small while allowing the emission surface area to be increased and visibility to be improved.

Preferably, the length of the light guide in the normal direction of the first emission face is shorter than the length of the light guide in the front and back direction of the chassis.

In this case, the size of the front cover in the up and down direction can be made even smaller.

Preferably, the light guide further comprises a structured face. The structured face is disposed on the opposite side from the first emission face, and has a plurality of optical structures aligned with one another. The optical structures are grooves that are inclined with respect to the width direction of the chassis, have a lateral cross sectional shape whose width narrows toward the groove bottom, and of the two ends of the optical structures, the ones disposed on the second emission face side are disposed farther away from the light source than the other ends.

In this case, the plurality of optical structures allow the light moving from the light source in the width direction of the saddle-riding type vehicle to be emitted by the light guide in two directions (the first emission face side and the second emission face side). Therefore, the emission surface area can be increased with a single light guide, and the size of the front cover can be kept small.

Preferably, in plan view, the incident angle of light moving from the light source in the width direction of the chassis with respect to the optical structure is at least a critical angle.

In this case, the brightness is increased on the first emission face side.

Preferably, the optical structures comprise a first side face and a second side face that is closer to the light source than the first side face. In front view, the incident angle of light moving from the light source in the width direction of the chassis with respect to the second side face is at least a critical angle.

In this case, the brightness is increased on the second emission face side.

Preferably, the plurality of optical structures include a plurality of first optical structures. The second optical structures that are disposed closer to the light source than the first optical structures, and are lower than the first optical structures.

In this case, there is less uneven brightness at the first and second emission faces.

Preferably, the structured face is disposed below the first emission face.

In this case, water drops and dust are less apt to accumulate in the plurality of optical structures within the structured face.

Preferably, in front view, adjacent optical structures overlap each other.

In this case, there is less uneven brightness at the first emission face.

Preferably, the light source is a position light, and the saddle-riding type vehicle further comprises a headlight that is disposed on the front cover away from the position light.

In this case, there is no need to provide an additional light source for light guide use. Therefore, the size of the front cover can be kept small, while increasing the emission surface area.

The light guide pertaining to this embodiment is utilized in the above-mentioned saddle-riding type vehicle.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A saddle-riding vehicle, comprising:
 a chassis having a front part;
 a front cover disposed at the front part;
 a light source disposed on the front cover and emitting light in a width direction of the chassis; and
 a light guide, that is disposed on the front cover, extending in the width direction of the chassis, and that receives and reflects the emitted light, the light guide including
   a first emission face that emits a first portion of the reflected light and that faces in an upward or downward direction from the chassis to emit the first portion of the reflected light in the upward or downward direction, and
   a second emission face that emits a second portion of the reflected light and faces in a forward direction from the chassis to emit the second portion of the reflected light in the forward direction, and
 wherein a length of the light guide in a front and back direction of the chassis and a length of the light guide in a normal direction of the first emission face that is normal to the first emission face are both shorter than a length of the light guide in the width direction of the chassis, and
 the light guide further includes a structured face having a plurality of optical structures that are disposed in a side of the light guide that is opposite from another side of the light guide that the first emission face is disposed within, each of the optical structures being parallelly aligned with another of the optical structures, and the optical structures being grooves that extend from a first end to a second end opposite the first end, the first end being disposed on the second emission face, and the grooves extending in a direction that is oblique to the front and back direction and the width direction of the chassis, wherein each respective one of the optical structures has a lateral cross sectional shape in which a width thereof narrows toward a bottom of the groove of the respective optical structure.

2. The saddle-riding vehicle according to claim 1, wherein the length of the light guide in the normal direction of the first emission face is shorter than the length of the light guide in the front and back direction of the chassis.

3. The saddle-riding vehicle according to claim 1, wherein in a plan view of the light guide, an incident angle of a first part of the emitted light from the light source with respect to the optical structures is at least a critical angle so as to reflect the first part of the emitted light as the second portion of the reflected light.

4. The saddle-riding vehicle according to claim 3, wherein the optical structures each comprise:
 a first side face; and
 a second side face that is closer to the light source than the first side face,
 wherein in a front view of the light guide, an incident angle of a second part of the emitted light from the light source with respect to the second side face is at least a critical angle so as to reflect the second part of the emitted light as the first portion of the reflected light.

5. The saddle-riding vehicle according to claim 1, wherein in a front view of the light guide, adjacent ones of the optical structures that are adjacent to each other in the width direction of the chassis overlap each other.

6. The saddle-riding vehicle according to claim 1, wherein the plurality of optical structures includes:
 a plurality of first optical structures; and
 a plurality of second optical structures that are disposed closer to the light source than the first optical structures and that each have a height that is smaller than that of each of the first optical structures.

7. The saddle-riding vehicle according to claim 1, wherein the structured face is disposed below the first emission face.

8. The saddle-riding vehicle according to claim 1, wherein the light source is a position light, and the saddle-riding vehicle further comprises a headlight that is disposed on the front cover and on an opposite side of the front cover than a side of the front cover that the position light is disposed on.

9. A light guide that is used on a saddle-riding vehicle comprising a front cover and a light source disposed on the front cover, and that receives light moving from the light source in a width direction of a chassis, the light guide comprising:
 a first emission face that emits a first portion of the reflected light and that faces in an upward or downward direction from the chassis to emit the first portion of the reflected light in the upward or downward direction;
 a second emission face that emits a second portion of the reflected light and that faces in a forward direction from the chassis to emit the second portion of the reflected light in the forward direction,
 wherein a length of the light guide in a front and back direction of the chassis and a length of the light guide in a normal direction of the first emission face that is normal to the first emission face are both shorter than a length of the light guide in the width direction of the chassis; and
 a structured face having a plurality of optical structures that are disposed in a side of the light guide that is opposite from another side of the light guide that the first emission face is disposed within, each of the optical structures being parallelly aligned with another of the optical structures, and the optical structures being grooves that extend from a first end to a second end opposite the first end,
 the first end being disposed on the second emission face, and
 the grooves extending in a direction that is oblique to the front and back direction and the width direction of the chassis,
 wherein each respective one of the optical structures has a lateral cross sectional shape in which a width thereof narrows toward a bottom of the groove of the respective optical structure.

10. The light guide according to claim 9,
 wherein the length of the light guide in the normal direction of the first emission face is shorter than the length of the light guide in the front and back direction of the chassis.

* * * * *